US005303399A

United States Patent [19]

Kobayashi

[11] Patent Number: 5,303,399

[45] Date of Patent: Apr. 12, 1994

[54] RADIO RECEIVER CAPABLE OF INDICATING CAPITAL AND SMALL LETTERS ON A DISPLAY

[75] Inventor: Hideaki Kobayashi, Saitama, Japan

[73] Assignee: Pioneer Electronic Corporation, Tokyo, Japan

[21] Appl. No.: 833,704

[22] Filed: Feb. 11, 1992

[30] Foreign Application Priority Data

May 16, 1991 [JP] Japan .................................. 3-110680

[51] Int. Cl.[5] .................................................. H04B 1/16

[52] U.S. Cl. ................................. 455/158.4; 455/158.5; 455/38.4

[58] Field of Search ...................... 455/38.4, 70, 154.1, 455/158.1, 158.4, 158.5, 185.1, 186.1; 340/311.1, 825.44, 790, 791, 792

[56] References Cited

U.S. PATENT DOCUMENTS 4,975,694 12/1990 McLaughlin et al. ......... 340/825.44

FOREIGN PATENT DOCUMENTS 0253735 10/1988 Japan .................................. 455/38.4
9016052 12/1990 World Int. Prop. O. ...... 340/825.44

*Primary Examiner*—Reinhard J. Eisenzopf
*Assistant Examiner*—Chi Pham
*Attorney, Agent, or Firm*—Sughrue, Mion, Zinn, Macpeak & Seas

[57] ABSTRACT

A radio receiver which displays characters on a display on the basis of a character data signal extracted from a broadcast radio wave which is transmitted by RDS and which is capable of discriminating whether a character displayed on the display means represents an alphabetic capital letter or a small letter of some language even if the display means is of an inexpensive and simple structure. The radio receiver includes a data extractor for extracting a character data from a broadcast radio wave currently being received; a detector for detecting the signal strength of a broadcast radio wave currently being received; a character pattern generator for generating a character pattern common to both an alphabetic capital and a small letters of English or of some other language in accordance with the character data signal; a character discriminator for discriminating a capital and a small letter in accordance with the character data signal; and a display for displaying a character pattern outputted from the character pattern generator in different displaying modes depending on which of a capital letter and a small letter should be displayed in accordance with the output from the control.

5 Claims, 7 Drawing Sheets

RADIO RECEIVER CAPABLE OF INDICATING CAPITAL AND SMALL LETTERS ON A DISPLAY

BACKGROUND OF THE INVENTION

1. Field of the Invention

This invention relates to a radio receiver that displays characters on a display means on the basis of character data signals extracted from a broadcast radio wave which is transmitted by RDS (Radio Data System; FM Character-Multiplex broadcasting system).

2. Description of the Prior Art

There is already known a radio system (RDS) which provides a service wherein when an ordinary radio station broadcasts a program, the information associated with program contents, is transmitted as data through multiplex modulation, thereby permitting the radio listeners to select program contents of their preference on the basis of the data demodulated at the receiver.

With this radio data system, a subcarrier of 57 KHz, which resides outside the band occupied by the FM modulation signal and which is the third harmonic of a 19 KHz stereo pilot signal, is amplitude modulated by a data signal which is filtered and biphase-coded, representative of the program contents to thereby provide radio data signals. A main carrier wave is frequency modulated by this amplitude modulated subcarrier, and then the main carrier is broadcast.

As apparent from FIG. 6, a base band coding structure of the radio data signal consists of 104 bits to form one group and is multiplex transmitted in a repeated manner. One group consists of four blocks, each including 26 bits, and each block consists of a 16-bit information word and a 10-bit check word.

In FIG. 6, block 1 is assigned a program identity code (PI), block 2 a traffic program identity code (TP), block 3 a station frequency (AF) of a network station which is broadcasting the same program as the station currently being received and block 4 program service name information data (PS) such as station name or network name.

Further, the above each group is distinguished by first 4 bits into 16 types, i.e. type 0 to type 15 differing in contents. Further, two versions, version A and version B are defined with respect to respective types (0 to 15) depending on whether the value of the next bit is respectively either 0 or 1. These identification codes are located in block 2. The station frequency (AF) code of the network stations is arranged to be transmitted only by type 0, group A, that is, the case in which the value of first 5 bits in block 2 are all 0, and the program service name (PS) information data is arranged to be transmitted by both type 0, group A and type 0, group B, in other words, either when the value of the first 5 bits are all 0, or when that of first 4 bits are 0 and of the fifth bit is 1.

In this manner, the radio data of the type 0, group A contains the station frequency (AF) data of the network stations which are broadcasting the same program as the station currently being received. When the broadcast wave is received, the station frequency (AF) data obtained by demodulating the broadcast wave is read and is then stored, and by this operation, when the receiving sensitivity of the station currently being received has become poor due to disturbances such as decreasing signal strength, another network station can be selected instead on the basis of the station frequency (AF) data of the network stations stored previously, thereby always permitting the radio listeners to listen to the same program with a good receiving condition free from disturbances.

On the other hand, the program service name information (PS) data is composed of eight or less than eight characters such as English characters, wherein as shown in FIG. 7 which shows a type drawing of a format of the type 0 group A, 16 bits (8 bits×2) representing two characters are transmitted by one group, so that eight characters are transmitted by four groups, and in addition, it is determined by the contents of version codes C1 and C0 of the block 2 that which of the eight characters the character in the group being transmitted is.

Further, a character data signal is discriminated whether it represents a capital letter (such as "A" in English Alphabet) or a small letter (such as "a" in English Alphabet) by, for example, the ASCII code, and thereafter it is displayed on a display device. However, if the display device adopted here has to be a cheap and simple one, it is normally constructed such that a character to be indicated is displayed in the capital letter form regardless of whether the character data signal represents a capital letter or a small letter.

Since conventionally used radio receivers are constructed as above, that is, since capital letters only are displayed on a display device, even if the display device can be of a cheap and simple construction, the letters displayed thereon cannot be discriminated whether they represent capital letters or small letters.

SUMMARY OF THE INVENTION

The present invention has been made to eliminate such a problem as described above, and it is an object of the present invention to obtain a radio receiver, by which it can be discriminated whether the characters displayed on the display device represent alphabetic capital letters or small letters in English (or may be in some other language) even if the display device is of a cheap and simple construction, and it is also an object of the present invention to obtain a method of controlling a display mode of the above radio receiver.

In order to attain the above object, a radio receiver according to the present invention is constructed such that it comprises: a data extracting means for extracting a character data from a broadcast radio wave currently being received; means for detecting the signal strength of a broadcast radio wave currently being received; a character pattern generating means for generating a pattern common to both an alphabetic capital and a small letters in English (or some other language) in accordance with the character data signal; a control means representing a character discriminating means for discriminating either a capital or a small letter in accordance with the character data signal; and a display means for displaying a character pattern outputted from the character pattern generating means in different displaying modes depending on which of a capital letter and a small letter should be displayed in accordance with the output from the control means representing the character discriminating means.

In order to attain the further object of the present invention, a method of controlling the display mode of the radio receiver comprises the steps of: detecting whether the broadcast wave currently being received includes a character data signal, whereby if the character data is detected therein, the frequency of the broadcast wave currently being received is displayed, or otherwise a program service name display subroutine is executed; determining whether the signal strength of the broadcast wave currently being received is less than a predetermined level for a predetermined period of time, whereby if the result is affirmative, then the frequency of the broadcast wave currently being received is displayed, or otherwise a program service name display subroutine is executed; wherein the program service name display subroutine further comprising the steps of: detecting whether the character data signal is an alphabetic letter, whereby if the result is affirmative, then a character other than alphabetic letters is displayed; determining whether the alphabetic letter is a capital letter or a small letter, whereby if it is a capital letter, then a capital letter is displayed, or otherwise, the displayed capital letter is put in an intermittent state.

Since a radio receiver according to the present invention is constructed as above, although both a capital and a small letters are displayed in the same pattern regardless of whether it is to be displayed as a capital letter or a small letter, in fact, they are displayed in two different displaying modes so as to be distinguished from each other. Therefore, the character displayed on the display device can be recognized whether it is a capital or a small letter according to the mode in which the character is displayed.

Other objects and features of the invention will be more fully understood from the following detailed description and appended claims when taken in conjunction with the accompanying drawings.

Figure 1:
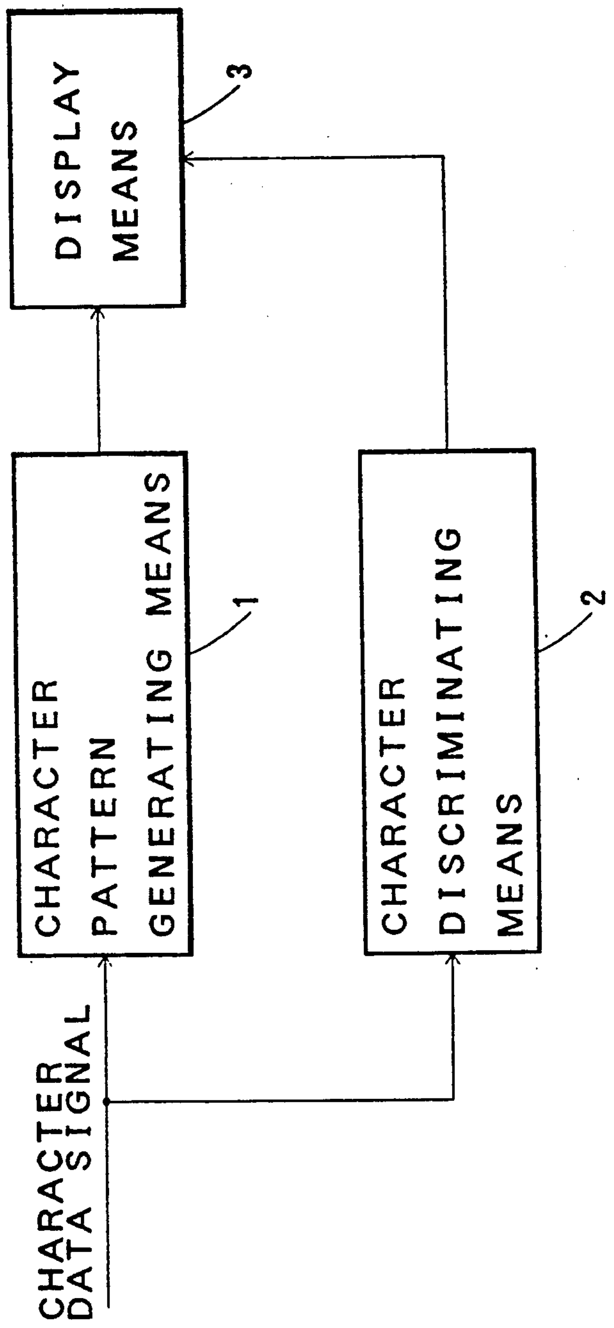
FIG. 1 is an illustration explaining the principle of the present invention.

In the figures, reference numeral 1 denotes a character generating means, reference numeral 2 denotes a character discriminating means, numeral 3 a display device, 12 a front end, 14 a FM detector, 15 a multiplex demodulator circuit, 16 a filter, 18 a D-PLL (digital-PLL) circuit, 19 a decoder, 24 a controller, 27 a display device, 28 a drive circuit, and reference numeral 29 denotes a ROM.

DETAILED DESCRIPTION OF THE PREFERRED EMBODIMENTS

In the following, an embodiment of the present invention is described with reference to the drawings.

Figure 2:
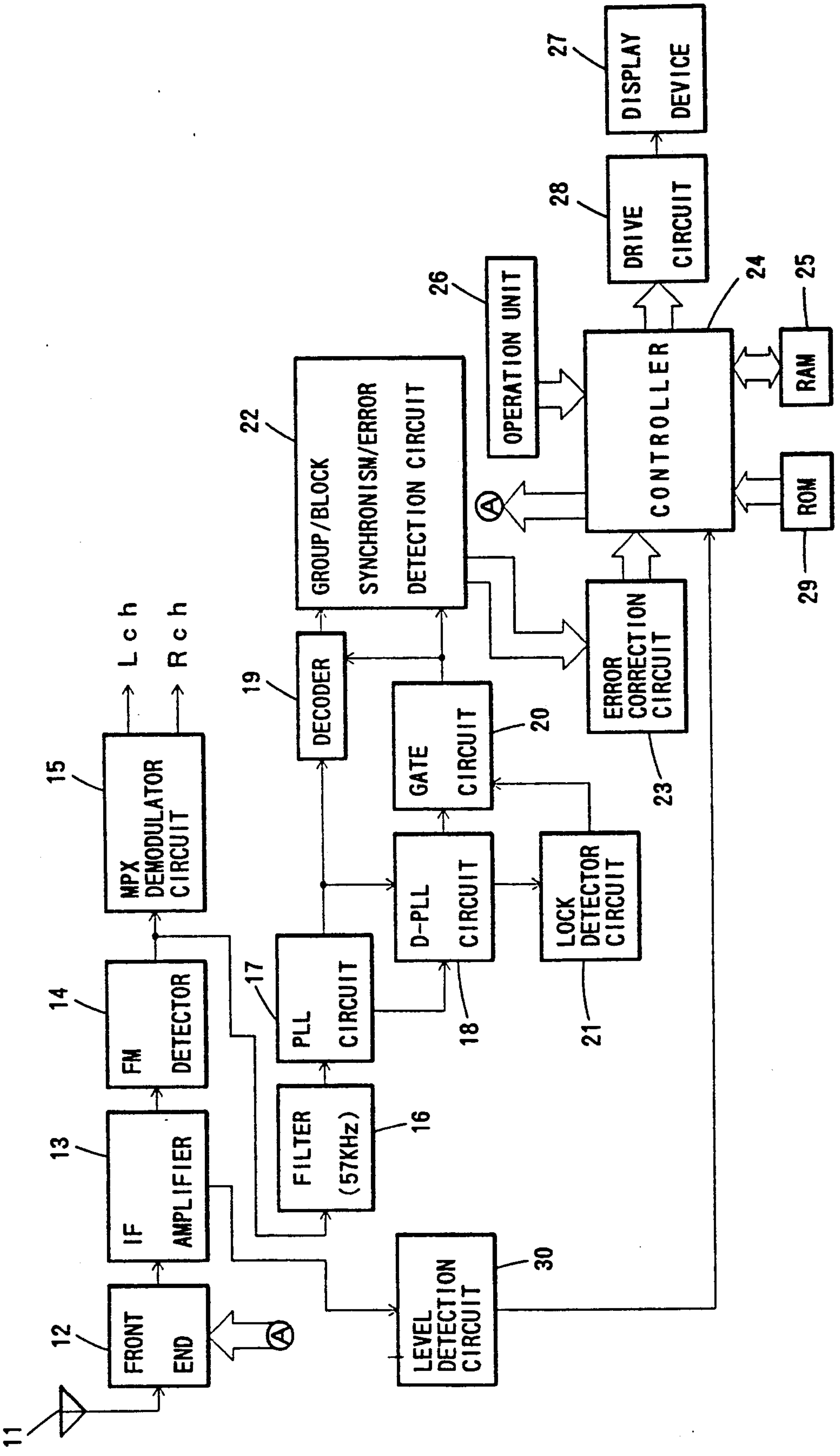
FIG. 2 is a block diagram showing a general construction of a radio receiver according to one embodiment of the present invention.

FIG. 2 is a block diagram showing an arrangement of a radio receiver according to one embodiment of the present invention.

In FIG. 2, a FM multiplex broadcast wave from a desired station can be selected at a front end 12 from FM multiplex broadcasts received by an antenna 11 and then converted into an intermediate frequency (IF), which is further supplied to a FM detector 14 by way of an IF amplifier 13.

The front end 12 is composed by a PLL synthesizer system which employs a PLL circuit including a programmable frequency divider, the division ratio of which is controlled by a controller 24, which will be described later, thereby effecting the operation of station selection.

Then, the detected output of the FM detector 14 is supplied to a MPX (multiplex) demodulator circuit 15 to produce audio signals separated into L (left) channel and R (right) channel. The detected output of the FM detector 14 also passes through a filter 16, whereby a radio data signal, that is a subcarrier of 57 KHz which is amplitude modulated by biphase coded data signals is sampled and then demodulated in a PLL circuit 17.

This demodulated output is supplied to a digital D-PLL circuit 18 and a decoder 19, and the D-PLL circuit 18 produces a clock for data demodulation on the basis of the demodulated output of the PLL circuit 17, and the thus produced clock is supplied to a gate circuit 20.

A lock detector circuit 21 detects that the D-PLL circuit 18 has been locked on, and generates a lock detection signal which is supplied to the gate circuit 20 causing it to be in a open state. Further, the data signal which is a biphase coded output from the PLL circuit 17 is decoded by the decoder 19 in synchronism with the clock produced in the D-PLL circuit 18.

Figure 6:
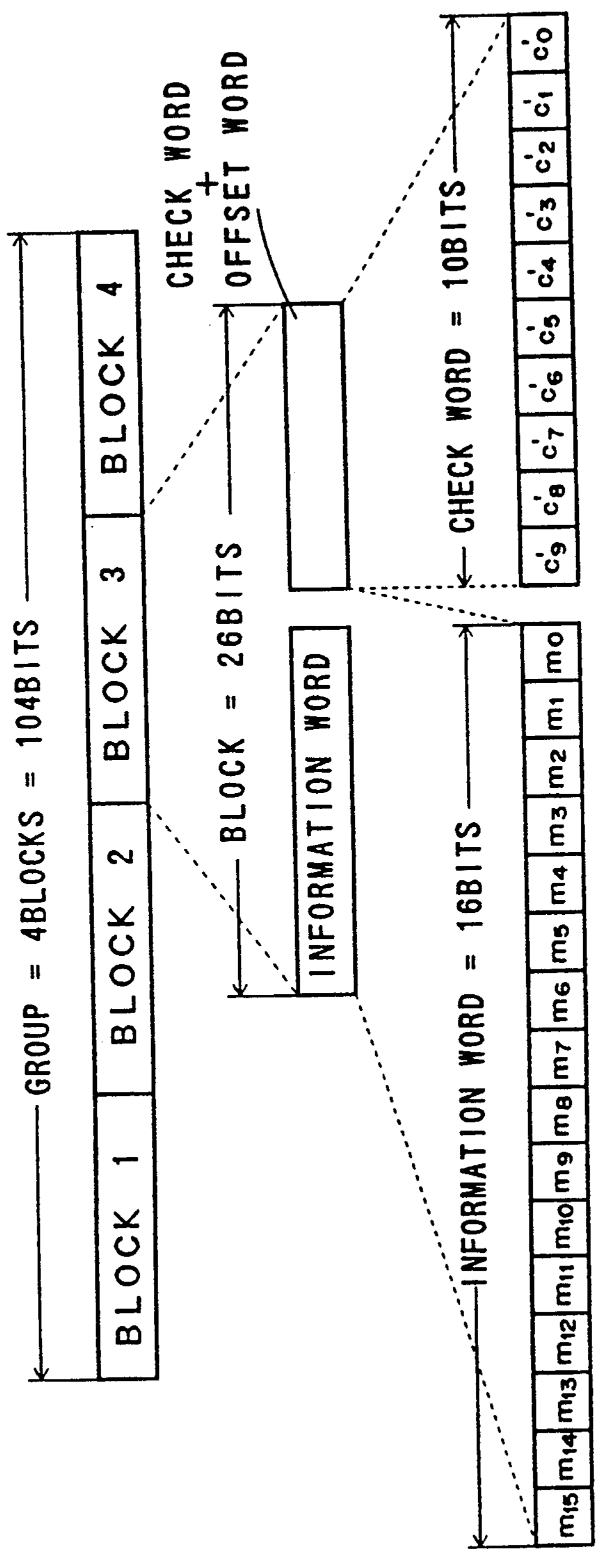
FIG. 6 is an illustration showing a the case-band coding structure.
Figure 7:
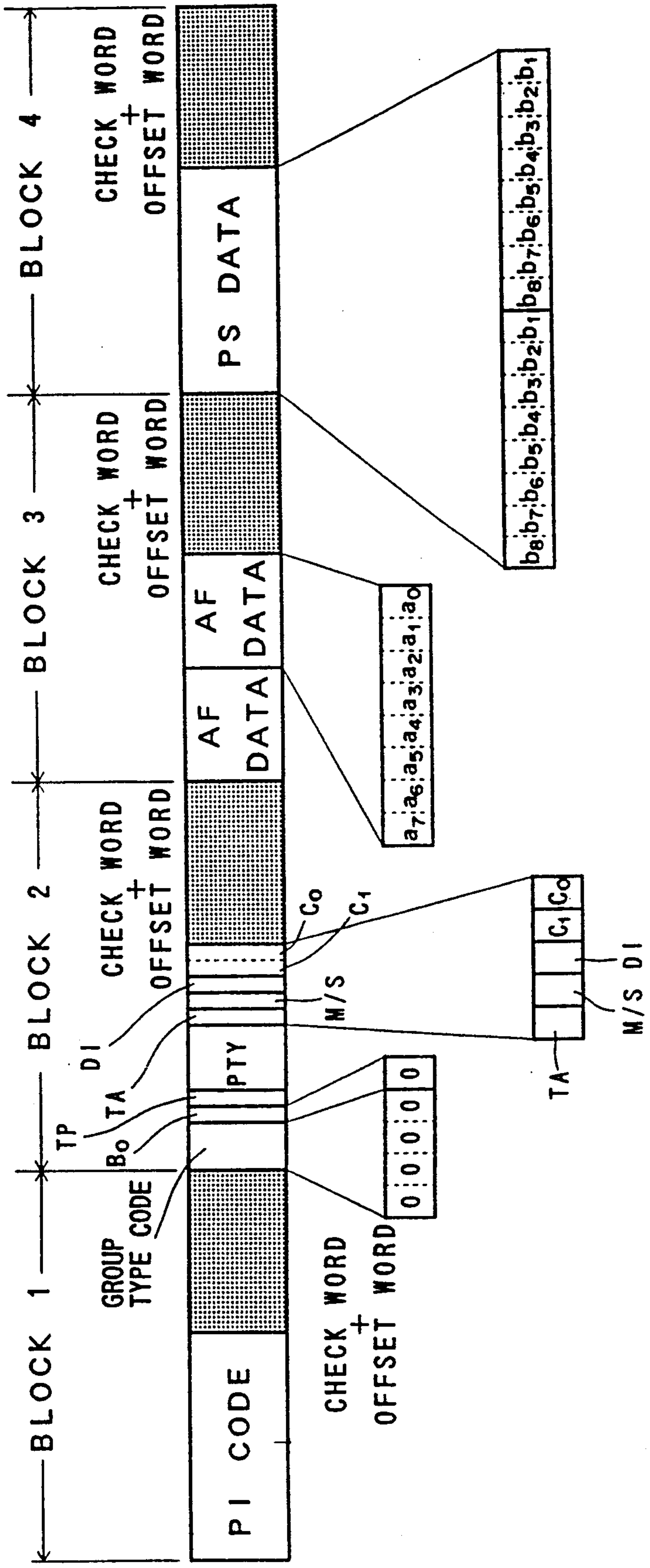
FIG. 7 is an illustration showing a format of the type 0A group.

The output data of the decoder 19 is a group having 104 bits which consists of four 26-bit blocks as shown in FIG. 6, and is supplied sequentially to a group/block synchronism/error detection circuit 22. In this group/-block synchronism/error detection circuit 22, block synchronism with group is effected on the basis of 10-bit offset words assigned to 10-bit check words of respective blocks, respectively, while at the same time error detection of 16-bit information word is effected on the basis of the check word.

Then, the error-detected data is subsequently corrected in an error correction circuit 23 and is supplied to the controller 24. The controller 24 includes a microprocessor, which reads the code information of the respective blocks 1 to 4 in the radio data or radio information which is inputted sequentially group by group, that is, radio data information associated with the program currently being received, and stores the information in a RAM 25. The controller 24 controls, on the basis of a station selection command from an operation unit 26, the division ratio of the programmable divider of the PLL circuit which is a part of the front end 2, thereby effecting selection of a station. The selected value of receiving-frequency data is stored into the RAM 25.

By the way, a detection signal which is outputted from a level detection circuit 30 when the level of the intermediate frequency (IF) signal has become lower than a predetermined level is supplied to the controller 24. In addition, when the controller 24 receives this detection signal, it determines that the receiving condition of the broadcast currently being received becomes poor, and controls the division ratio of the programmable divider of the front end 2 so as to select another network station on the basis of the station frequency (AF) information of the network stations previously stored in the RAM 25.

Further, the controller 24 is connected to a display device 27 by way of a drive circuit 28, the display device being provided with, for example, 12-segment display elements, which are capable of displaying eight characters altogether including alphanumeric characters.

Figure 3:
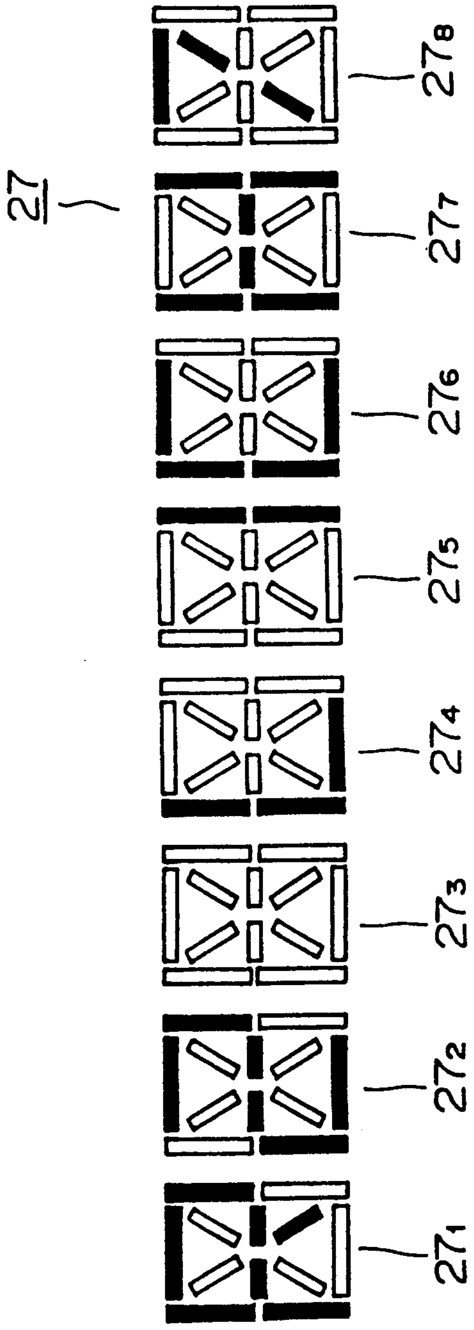
FIG. 3 is an illustration explaining one embodiment of the present invention.

FIG. 3 shows the appearance of one part of the display device 27. In the figure, the character pattern data which will be displayed on the display device which is composed of eight 12-segment elements $27_1$ to $27_8$ is written into a ROM 29 previously, and the controller 24 reads the character pattern data of characters to be displayed from the ROM 29 and loads the data into a buffer in the drive circuit 28 for displaying the characters on the display elements $27_1$ to $27_8$.

As described above, the controller 24 discriminates whether a character to be displayed is a capital letter or a small letter on the basis of the character data signal. By the way, the character pattern generating means 1 and the character discriminating means 2 shown in FIG. 1 correspond, respectively, to the ROM 29 and the controller 24, and the display means 3 shown in FIG. 1 also corresponds to the display device 27 and the drive circuit 28 shown in FIG. 2.

Figure 4:
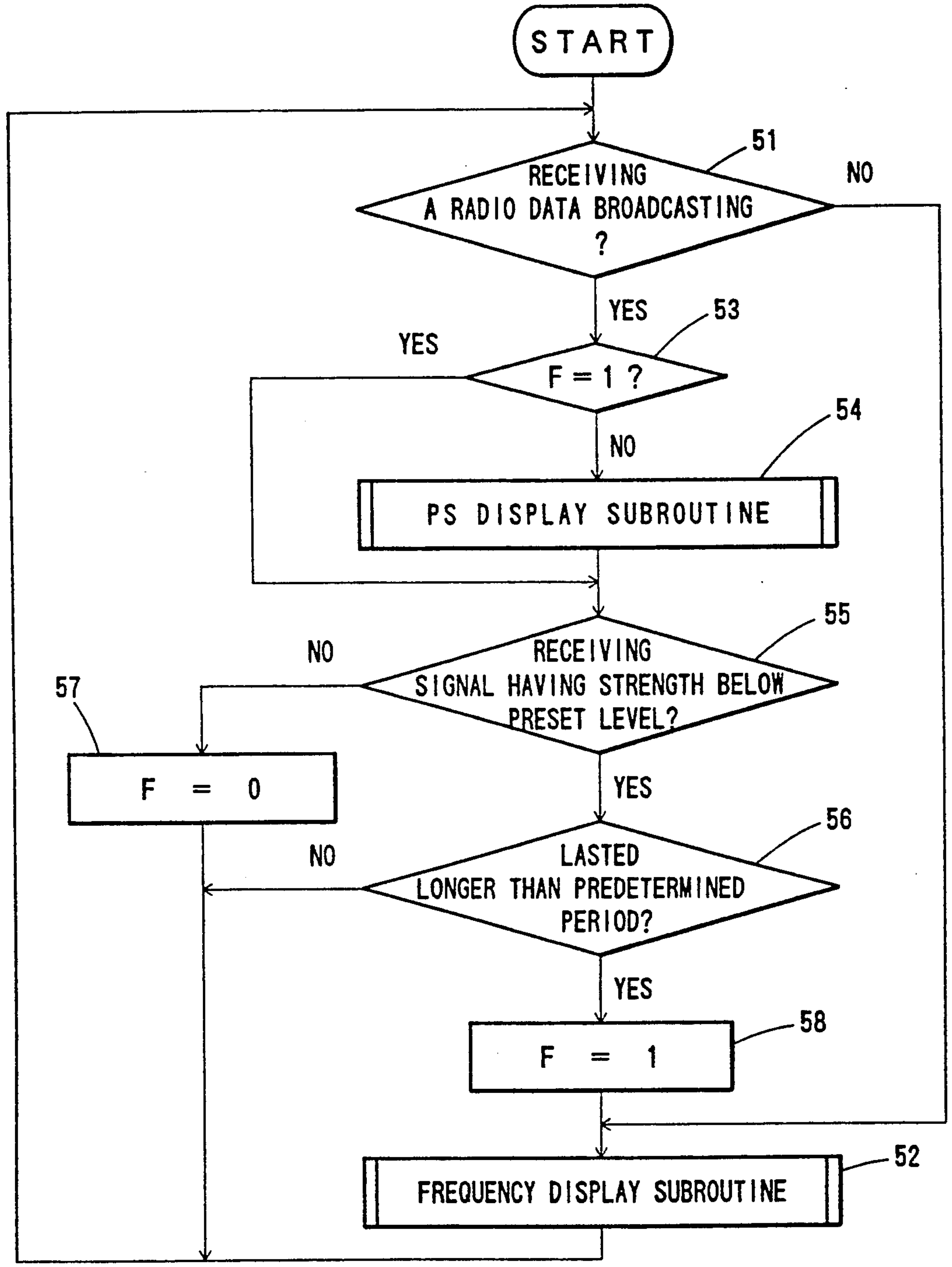
FIG. 4 is a flowchart explaining a general action.

The control procedure carried out by the controller 24 will now be described with reference to a flow chart in FIG. 4. The controller first makes a decision based on whether or not a radio data broadcast is being received (step 51). If the receiver is receiving a station which is not broadcasting the radio data, then the controller carries out a frequency display subroutine for displaying the frequency of this station on the display device 27 (step 52).

In the frequency display subroutine, the controller reads the frequency data of the station currently being received which has been stored in the RAM 25, and also reads character patterns corresponding to this frequency from the ROM 29, then supplies the character patterns to the drive circuit 28.

On the other hand, when a radio data broadcasting station is being received, a decision is made on whether or not a flag F is 1 (step 53), and if F=0, then a program service name (PS) information display subroutine is executed to display the program service name data on the display device 27 (step 54). By the way, the flag F is initially set to 0 when power is switched on.

When F=1 in step 53 or after execution of step 54, a decision is made on the basis of the output of level detection circuit 30, whether or not the signal strength currently being received has decreased to a level less than the predetermined level (step 55). In this step 55, if it is detected that the signal strength has decreased below the predetermined level, then a decision is made based on whether or not this receiving condition has lasted for a predetermined period of time (step 56), where the predetermined period of time is the time, for example, required for a search of station frequency (AF) data within the memory to make one complete cycle.

On the other hand, if it is detected in step 55, that the signal strength is higher than the predetermined level, then the flag F is reset to 0 (step 57), and then the program service name (PS) display will appear on the display device if the signal strength is higher than the predetermined level at next process cycle. Also, if the signal strength is less than the predetermined level, but does not last longer than the predetermined period of time, the program service name (PS) display will remain on the display. However, if the signal strength continues to be less than the predetermined level for the predetermined period of time, then the flag F is set to 1 (step 58) and the procedure advances to step 52 to display the frequency currently being received on the display device 27.

Now the program service name (PS) data display subroutine is explained below referring to the flow chart shown in FIG. 5.

In this program service name data display subroutine, first, it is judged whether what is to be displayed is either of a capital letter code or a small letter code (Step 61), and if either of the letter codes should be displayed, then it is judged whether the letter code is a capital letter code or a small letter code (Step 62), thereafter, if the result is a small letter code, then it is converted to the capital letter code (Step 63), and after the character pattern is generated (Step 64), the display mode is decided, for example, to be put in a intermittent condition or the like. (Step 65).

On the other hand, if the result of the judgment at step 61 is negative, the procedure advances to step 66 in which a character other than letter codes is generated, and if the result of the judgment at step 62 is negative, then a capital letter code is generated (Step 66').

Further, after the steps 65 and 66 (66'), it is judged whether or not the display of all the eight characters is performed, and if it is determined that all of eight characters have not been displayed yet, then the procedure returns to step 61, or otherwise, in other words if it is judged that all of eight characters have been displayed, then the procedure advances to step 55.

In the above case that the characters are displayed on the display device 27, if the displayed characters are read as "R2 LICHT" representing "the second broadcasting station, light music", as shown in FIG. 3, for example, the displaying elements $27_1$ and $27_2$, $27_4$ to $27_8$ respectively display capital letters, and the displaying elements $27_4$ to $27_8$ representing "LICHT" are put in a intermittent condition. Therefore, even if the character displayed on the displayed device 27 is a capital letter, it can be judged whether the displayed letter is really a capital letter or a small letter in accordance with the displaying mode thereof.

By the way, in the above example, one case is explained in which a small letter corresponding to the capital letter displayed on the display device 27 is put in a intermittent condition so as to notify that it is a small letter although displayed as a capital letter, the intermittent state can be put in the other way round, or otherwise, these capital and small letters can be discriminated from each other by using 2-color light emitting diode for the display device 27 and emit different colors from each other.

Figure 5:
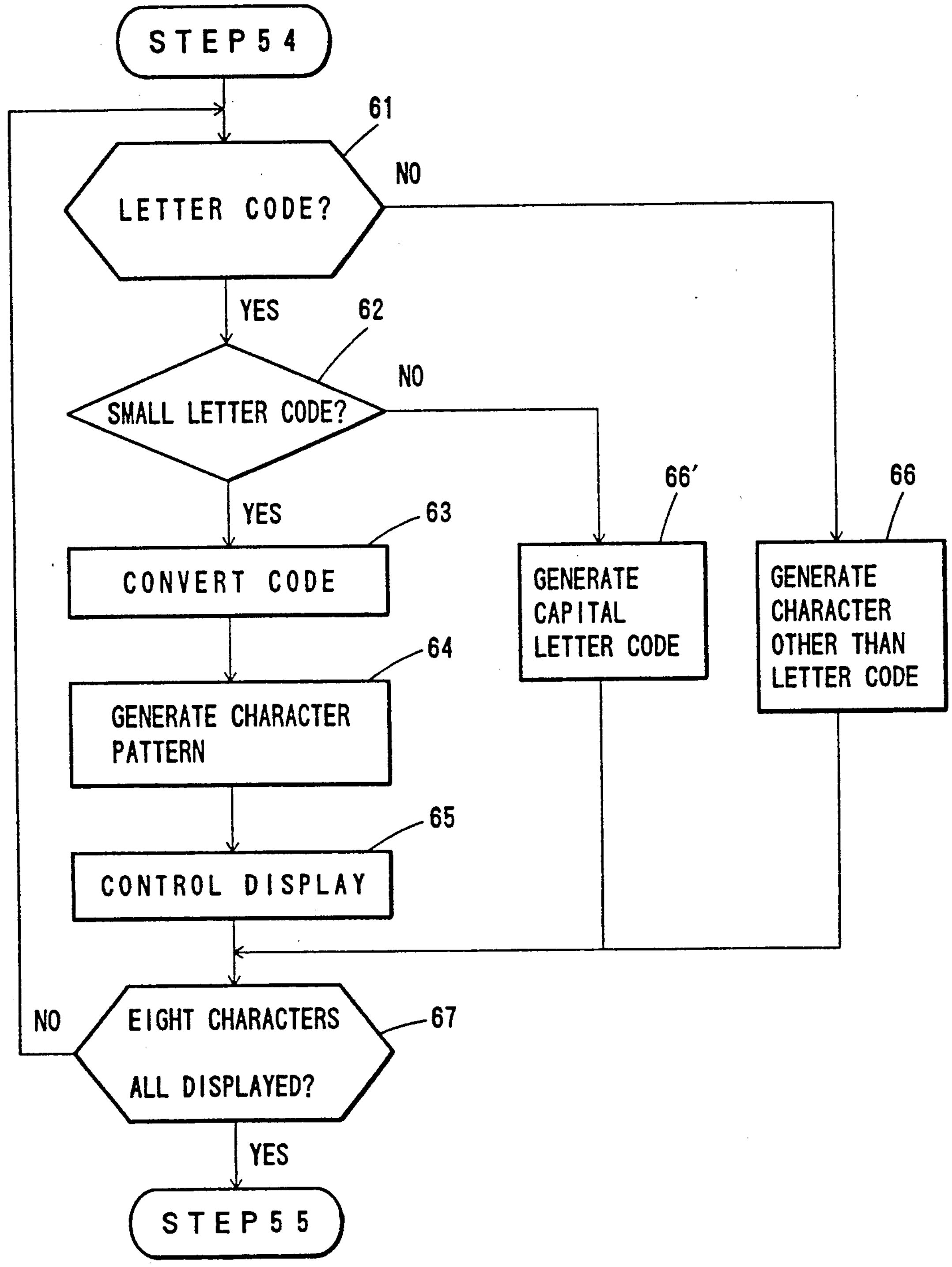
FIG. 5 is a flowchart explaining the program service name information data display subroutine which displays characters.

Further, in the case that the controller 24 generates a character pattern common to the both capital and small letters as shown in FIG. 5, the step 63 is omitted.

Effect of the Invention

As explained above, since a radio receiver according to the present invention is constructed such that it comprises a character pattern generating means 1 for generating a pattern common to both an alphabetic capital and small letters in English or in other languages on the basis of a character data signal extracted from a radio broadcast wave on which the character data signal is multiplexed, a character discriminating means 2 for selecting either a capital letter or a small letter in accordance with the character data signal, and a display means 3 for displaying the character pattern outputted from the character pattern generating means 1 on the basis of the output from the character discriminating means 2 in different modes depending on which of a capital letter and a small letter should be displayed thereon, although both a capital and a small letters are displayed in the same pattern regardless of whether it is to be displayed as a capital letter or a small one, in fact, they are displayed in two different displaying modes so as to be distinguished from each other, and therefore, the character displayed on the display device can be recognized whether it is a capital or a small letter according to the mode in which the characters is displayed.

While the invention has been described with reference to specific embodiments, the description is illustrating and is not to be construed as limiting the scope of the invention. Various modifications and changes may occur to those skilled in the art without departing from the spirit and scope of the invention as defined by the appended claims.

What is claimed is:

1. A radio receiver capable of extracting a character data signal which is multiplexed on a broadcast radio wave, said radio receiver comprising:

data extracting means for extracting the character data signal from the broadcast radio wave currently being received;

character pattern generating means coupled to said data extracting means for generating a character pattern common to both capital and small alphabetic letters of a language in accordance with said character data signal;

control means representing a character discriminating means coupled to said data extracting means for discriminating either a capital or small letter code in accordance with said character data signal to provide an output signal; and display means for displaying said character pattern outputted from said character pattern generating means in different displaying modes depending on which of said capital and small alphabetic letters should be displayed in accordance with the output signal from said control means.

2. A radio receiver as defined in claim 1, wherein said display means further comprises a drive circuit and a display device connected thereto, said display device being composed of a plurality of plural-segment display elements.

3. A radio receiver as defined in claim 2, wherein said character pattern displayed on each of said display elements is put in an intermittent state, when said character data represents an alphabetic small letter of said language.

4. A radio receiver as defined in claim 1, further comprising means for detecting the signal strength of the broadcast radio wave currently being received wherein said control means displays on said display means the frequency value of the broadcast wave currently being received when a data signal is not extracted by said data extracting means, and displays on said display means a program service name when a data signal is extracted by said data extracting means; wherein when said data signal extracted by said data extracting means has a signal strength less than a predetermined level for a predetermined period of time, said control means displays the frequency of the broadcast wave currently being received on said display means, and wherein said program service name data is displayed on said display means in different modes depending on what kind of character said extracted data signal represents.

5. A method of controlling a display mode of a radio receiver which is capable of extracting a character data signal which is multiplexed on a broadcast radio wave, comprising the steps of:

detecting whether the broadcast wave currently being receiver includes a character data signal, whereby if said character data signal is not detected therein, the frequency of the broadcast wave currently being received is displayed, and if said character data signal is detected, then a program service name display subroutine is executed;

if said character data signal is detected, determining whether the signal strength of the broadcast wave currently being received is less than a predetermined level for a predetermined period of time, whereby if the result is affirmative, then the frequency of the broadcast wave currently being received is displayed, or otherwise a program service name display subroutine is executed;

said program service name display subroutine further comprising the steps of:

detecting whether said character data signal is an alphabetic letter, whereby if the result is negative, then a character other than alphabetic letter is displayed;

determining whether the alphabetic letter is a capital letter or a small letter, whereby if it is determined to be a capital letter, then a capital letter is displayed, or otherwise, the displayed capital letter is put in a intermittent state.

* * * * *